United States Patent
Nauka et al.

(10) Patent No.: US 7,391,706 B2
(45) Date of Patent: Jun. 24, 2008

(54) DATA STORAGE DEVICE INCLUDING CONDUCTIVE PROBE AND FERROELECTRIC STORAGE MEDIUM

(75) Inventors: Krzysztof Nauka, Redwood City, CA (US); Chung C. Yang, Saratoga, CA (US)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 549 days.

(21) Appl. No.: 10/698,717

(22) Filed: Oct. 31, 2003

(65) Prior Publication Data

US 2005/0094430 A1 May 5, 2005

(51) Int. Cl.
*G11B 7/00* (2006.01)
(52) U.S. Cl. .................... 369/126; 369/101
(58) Field of Classification Search ............... 369/126, 369/101; 365/151
See application file for complete search history.

(56) References Cited

U.S. PATENT DOCUMENTS

| | | | |
|---|---|---|---|
| 2,922,986 A | 1/1960 | Chynoweth | |
| 4,731,754 A | 3/1988 | Ogden et al. | |
| 5,254,504 A * | 10/1993 | Van der Spiegel et al. | 438/3 |
| 5,371,729 A | 12/1994 | Yamamoto et al. | |
| 5,418,029 A | 5/1995 | Yamamoto et al. | |
| 5,481,527 A * | 1/1996 | Kasanuki et al. | 369/126 |
| 5,557,596 A | 9/1996 | Gibson et al. | |
| 5,835,477 A | 11/1998 | Binnig et al. | |
| 5,985,404 A * | 11/1999 | Yano et al. | 428/846.1 |
| 6,046,973 A * | 4/2000 | Thomas | 369/126 |
| 6,064,587 A | 5/2000 | Jo | |
| 6,477,132 B1 * | 11/2002 | Azuma et al. | 369/126 |
| 6,945,633 B2 * | 9/2005 | Imanaka et al. | 347/58 |
| 2002/0066855 A1 | 6/2002 | Choi et al. | |
| 2002/0110074 A1* | 8/2002 | Gibson | 369/101 |
| 2003/0053400 A1 | 3/2003 | Cho et al. | |
| 2004/0090903 A1* | 5/2004 | Cho et al. | 369/126 |

FOREIGN PATENT DOCUMENTS

| | | |
|---|---|---|
| EP | 1486966 | 12/2004 |
| JP | 06-060446 A | 3/1994 |
| JP | 11-352137 A | 12/1999 |
| JP | 2003-296979 A | 10/2003 |

OTHER PUBLICATIONS

Cho et al. "Terabit inch-2 ferroelectric data storage using scanning nonlinear dielectric microscopy nanodomain engineering system" Institute of Physics Publishing, Nanotechnology 14 pp. 637-642 (Apr. 2003).

* cited by examiner

*Primary Examiner*—Wayne Young
*Assistant Examiner*—Van T. Pham
(74) *Attorney, Agent, or Firm*—Myers Bigel Sibley & Sajovec, P.A.

(57) ABSTRACT

A data storage device includes a conductive probe having a tip; a substrate; and a data storage medium including a layer of poled ferroelectric material. The ferroelectric layer is between the tip and the substrate.

2 Claims, 7 Drawing Sheets

//DATA STORAGE DEVICE INCLUDING CONDUCTIVE PROBE AND FERROELECTRIC STORAGE MEDIUM

BACKGROUND

For decades researchers have been working to increase storage density and reduce storage cost of data storage devices such as magnetic hard drives, optical drives, and semiconductor random access memory. However, increasing the storage density is becoming increasingly difficult because conventional technologies appear to be approaching fundamental limits on storage density. For instance, data storage based on conventional magnetic recording is rapidly approaching fundamental physical limits such as the superparamagnetic limit, above which magnetic bits are not stable at room temperature.

Storage devices that do not face these fundamental limits are being researched. A first example includes multiple electron sources having electron emission surfaces that are proximate a phase-change storage medium. During write operations, the electron sources bombard the storage medium with relatively high current density electron beams. During read operations, the electron sources bombard the storage medium with relatively low current density electron beams.

A second example includes a contact probe and a storage medium. In one embodiment, the storage medium is formed from a substrate, a conductive layer on the substrate, and a dielectric layer on the conductive layer. The probe records data in the storage medium by forming holes in the dielectric layer. The holes expose the surface of the conductive layer. During read operations, the probe is scanned across the storage medium. When the tip of the probe encounters a hole, the tip falls into the hole, and a short occurs between the probe tip and conductive layer.

These devices are purported to offer high storage density. However, the first example must still overcome the challenge of fabricating electron emitters that provide uniform and sufficient current density at small beam size for the recording. The second example suffers from tip wearout, and its recording speed is limited by the mechanical response time of the tip assembly.

SUMMARY

According to one aspect of the present invention, a data storage device includes a conductive probe having a tip; a substrate; and a data storage medium including a layer of poled ferroelectric material on the substrate. The ferroelectric layer is between the tip and the substrate.

Other aspects and advantages of the present invention will become apparent from the following detailed description, taken in conjunction with the accompanying drawings, illustrating by way of example the principles of the present invention.

DETAILED DESCRIPTION

Figure 1:
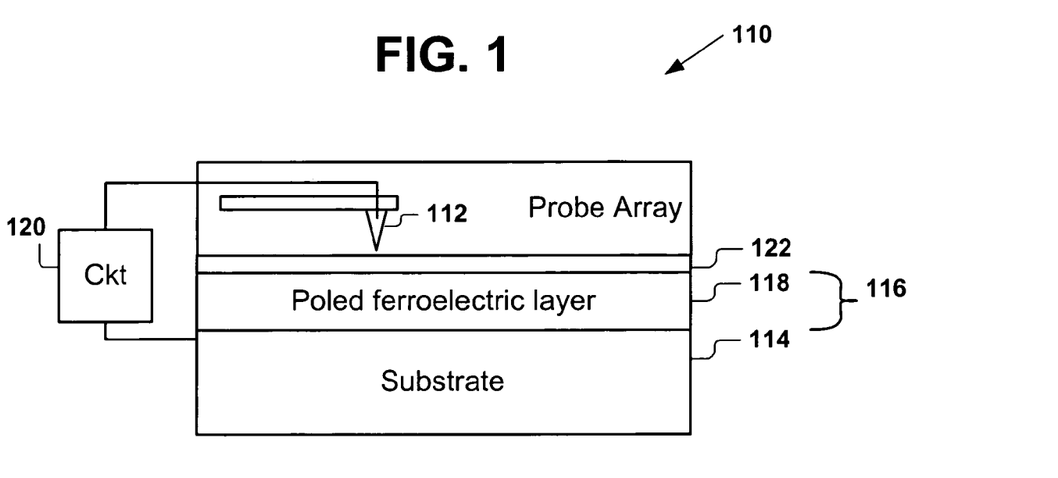
FIG. 1 is an illustration of a data storage device according to an embodiment of the present invention.

Referring to FIG. 1, a data storage device 110 includes an array of conductive probes 112, a substrate 114, and a ferroelectric storage medium 116. The ferroelectric storage medium 116 includes a layer 118 of poled ferroelectric material. The poled ferroelectric layer 118 is on the substrate 114, between the substrate 114 and tips of the probes 112. The ferroelectric layer 118 functions as a ferroelectric storage medium or data recording layer.

Figure 2A:
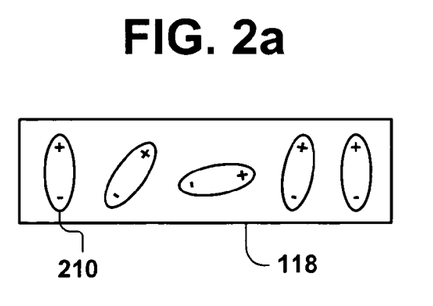
FIGS. 2a and 2b are illustrations of a ferroelectric layer before and after poling.
Figure 2B:
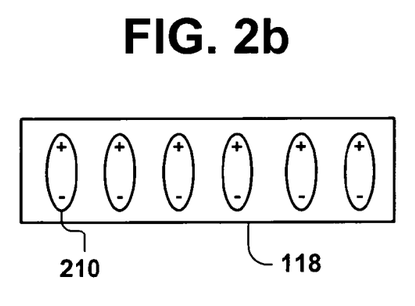

The ferroelectric layer 118 is poled to order its electrical dipoles in a uniform direction, and to define one of the binary states for the storage of information (FIGS. 2a and 2b illustrate the dipoles 210 in the ferroelectric layer 118 before poling and after poling). For instance, the poling can be performed by applying an electric field to the ferroelectric material either during or after deposition of the ferroelectric layer 118. The electric field causes the electrical dipoles of the ferroelectric layer 118 to line up along the direction of the applied electric field.

Coercivity of the ferroelectric material is a property relating to the electric field needed to align an electric dipole. Curie temperature of the ferroelectric material is the maximum temperature at which dipole alignment is maintained. If the ferroelectric layer is exposed to a temperature above the Curie temperature, the dipole polarization of the layer will become randomized. However, spontaneous reversal of the dipoles at temperatures below the Curie temperature is unlikely due to the complex nature of the dipoles. Thus data storage should be stable (e.g., bits aren't inadvertently flipped) as long as ambient temperatures remain below the Curie temperature.

It is preferable to use a ferroelectric material that is polymeric, or an inorganic ferroelectric material with a thin top polymeric coating, or a polymeric ferroelectric material with a thin coating of inorganic or organic material. Polymeric material tends to be softer than the probe tip material and, therefore, minimizes tip wearout and better preserves the electrical properties of the ferroelectric layer 118. A non-exhaustive list of exemplary polymeric ferroelectric materials is provided in the following table.

| | |
|---|---|
| PVDF | Polyvinylidene fluoride |
| PtrFE | Polytrifluoroethylene |
| Copolymers with PVDF | P(VDF/TrFE), P(VDF/TFE) |
| | TFE-tertrafluoroethane |
| Blends containing PVDF (includes addition of plasticiders) | PVDF/PMMA(poly methyl methacrylate) |
| | PVDF/PEA(poly ethyl acrylate) |
| | PVDF/PVAc(poly vinyl acetate) |
| | PVDF/PVF(poly vinyl fluoride) |
| Selected nylons | odd-numbered |
| | alicyclic |
| | aromatic |
| | fluorinated |

-continued

| | |
|---|---|
| VDF-cyanide polymers and copolymers | |
| Cyanopolymers | Polyacrylonitrides polyvinylidenecyanide |
| Polyureas, polythioureas | |
| FLC | ferroelectric liquid crystal polymers |
| polymer-ferroelectric ceramic composites | ceramic nanoparticles suspended in polymer |

The data storage device 110 further includes a protective layer 122 on the ferroelectric layer 118. The protective layer 122 may be made of a different or neutral material that does not interfere with interactions between the probe tips and the ferroelectric layer 118.

The substrate 114 is not limited to any particular material. Exemplary materials for the substrate include glass, metal, plastic, and semiconductors. However, a substrate made of a semiconductor can be used advantageously for certain types of read operations, as described below.

Exemplary conductive probes 112 include, without limitation, metal tips, conductive semiconductor tips (e.g., doped silicon), carbon nanotubes, and tips combining two or more materials (e.g., a conductive core and coating enhancing the desired properties of the tip, or an insulating core with a conductive coating). The tips of the conductive probes 112 may be several nanometers in diameter, up to about 100 nm. Only a single conductive probe 112 is shown in FIG. 1 to simplify the illustration of the data storage device 110; in practice, however, the array may include a multitude of conductive probes 112.

The data storage device 110 further includes a read/write circuit 120. The probe 112 and the circuit 120 are used to perform various types of data access operations on the storage medium 116. Exemplary data access operations include write, erasure, overwrite, and read operations.

The amount and degree of contact between the probe tips and ferroelectric layer 118 will depend upon how the probes 112 are used to perform these data access operations. The tips can hover above the surface of the ferroelectric layer 118.

In the alternative, the tips can be dragged on the surface of a bare ferroelectric layer 118. However, dragging the probes 112 across the ferroelectric layer 118 can damage the ferroelectric layer 118, in addition to wearing out the probe tip. The damaged region might become "electrically" dead and not contribute to the overall signal. Appropriate adjustment of the initial thickness of the ferroelectric layer 118 can ensure that the signal strength remains satisfactory despite of loosing the surface of the ferroelectric layer 118.

If the ferroelectric layer 118 is covered with a protective layer 122, the probe tips can be partially buried in the protective layer 122 and dragged across the ferroelectric layer 118. The protective layer 122 functions as a sacrificial layer in that the probes 112 damage the protective layer 122 instead of the ferroelectric layer 118.

The probes 112 may be stationary relative to the storage medium 116. Thus, the distances (if any) between the ferroelectric layer 118 and probe tips can be fixed during the data access operations. In the alternative, the probes 112 and ferroelectric layer 118 may be moved relative to each other during data access operations. The probes 112 can be raised and lowered with respect to the ferroelectric layer 118. Either the probes 112 or ferroelectric layer 118 or both can move in plane parallel to each other. Thus the probes 112 may be scanned across the storage medium 116 during data access operations, allowing a single tip to interact with multiple bits on the ferroelectric layer 118. Vertical tip movement and horizontal movement of the ferroelectric layer 118 or the probes 112 or both can be implemented via appropriate micromechanical movers. Exemplary mechanisms for scanning the probe arrays across the storage medium 116, are disclosed in U.S. Pat. No. 5,835,477.

Figure 3:
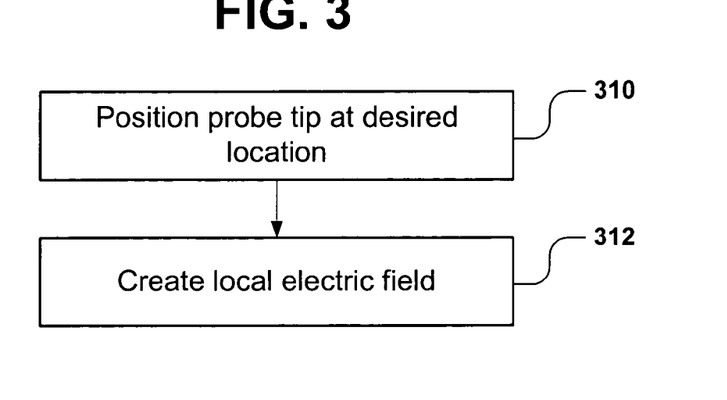
FIG. 3 is an illustration of a write operation in accordance with an embodiment of the present invention.

Reference is now made to FIG. 3, which illustrates a write operation. The probe 112 is positioned so its tip is in the vicinity of, or in contact with, the ferroelectric layer 118 at a designated location (310). When the tip is at a designated location, the circuit 120 applies a voltage to the probe 112, whereby a local electric field is created (312). The local electric field creates a localized dipole polarization (bit) with a desired polarity. The polarity at the desired location may remain the same as in the surrounding polarized dipoles of the portions of the ferroelectric layer 118, or it may be reversed. The ferroelectric layer 118 can remain electrically grounded during the write operation, or a constant bias can be applied to the ferroelectric layer 118 in order to enhance the local polarization reversal process.

Figure 4:
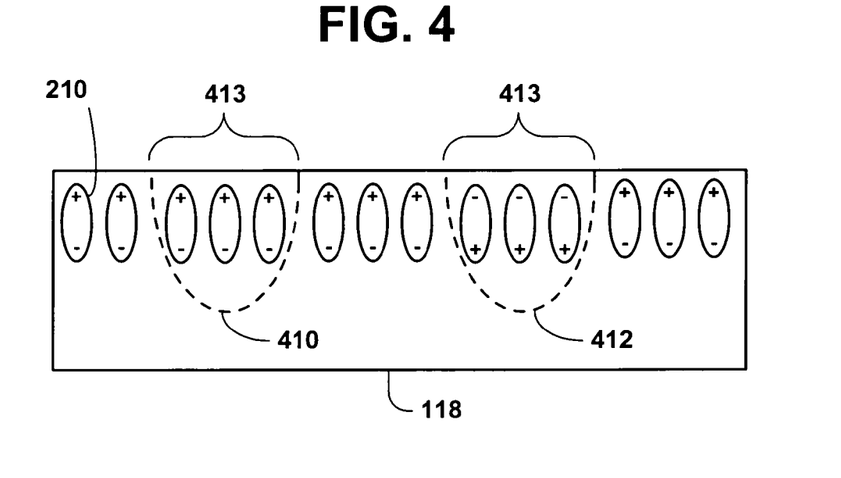
FIG. 4 is an illustration of information stored in a ferroelectric layer by orienting electrical dipoles within selected regions of the ferroelectric layer.

Reference is now made to FIG. 4. Writing of a bit means that locally, within a small volume (marked in FIG. 4 with dotted lines), ferroelectric dipoles 210 have been switched in a direction relative to the polarization of the surrounding medium. If the dipoles 210 in the ferroelectric layer 118 are set to a first (reference) direction (e.g., dipoles 210 pointing down), and a volume 410 has dipoles 210 pointing in the same direction, that volume 410 stores the first logic value. If a volume 412 has dipoles 210 pointing opposite the reference direction, the volume 412 stores a second logic value.

The volumes that contain similar dipole polarization orientation are spaced-apart in the ferroelectric layer 118. Size and shape of the bits 413 are determined by the probe tip size and electric field profile that is supplied by the probe tip. The minimum distance between the volumes is determined by probe size, the electric field profile that is produced by the probe 112, the ability to distinguish between two adjacent volumes, interaction between adjacent volumes, etc.

A bit 413 can be locally erased by bringing the probe tip into position where the bit 413 was previously written and then having the circuit 120 apply reverse bias to the probe 112, so the local polarization is brought to the polarization of the surrounding ferroelectric medium. A block erasure can be performed by dragging the probe tip along the ferroelectric layer 118 across multiple bits 413, while the circuit 120 applies a constant voltage bias to the probe 112 to restore the initial polarization of the bits.

Figure 5:
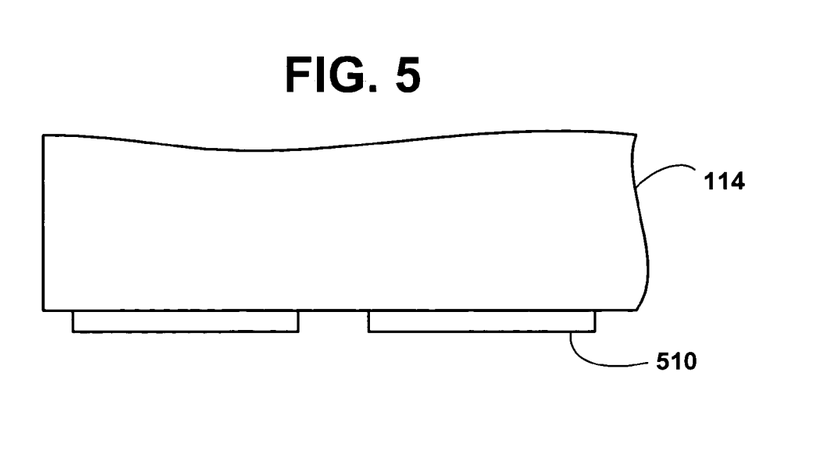
FIG. 5 is an illustration of resistive elements for performing selective erasures in accordance with an embodiment of the present invention.

A bulk erasure can be performed over the entire ferroelectric layer 118 by dragging the probe tips, or by heating the ferroelectric layer 118 above its Curie temperature and cooling off the ferroelectric material to room temperature in the presence of a poling field. The heating may be performed via joule heating or radiant heating. For example, one or more resistive heaters 510 may be located at the back of the substrate 114, as shown in FIG. 5. Multiple heaters could be assigned to sections of the substrate 114. The heaters 510 can be selectively turned on to erase blocks of bits 413.

A read operation may be performed by scanning a probe 112 over multiple bits 413 in the ferroelectric layer 118 and detecting reversals in polarity. A non-reversal of polarity at a bit indicates one logic state, and a reversal of polarity at a bit indicates a second logic state. There are a variety of approaches toward detecting polarity reversals. Seven different examples will now be described. Some of these examples are dependent upon the type of material used for the substrate 114.

Figure 6A:
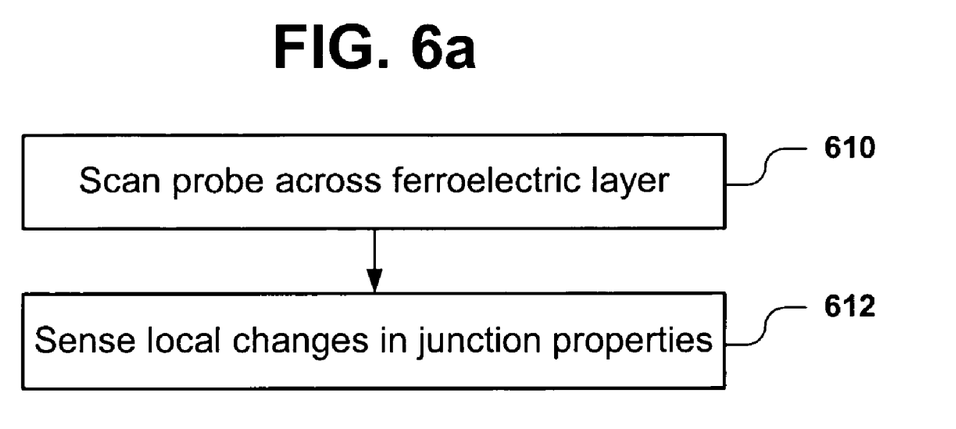
FIGS. 6a-6g are illustrations of read operations in accordance with different embodiments of the present invention.

FIG. 6a shows a first example. The substrate 114 is made of a semiconductor. At an interface, the substrate 114 and the ferroelectric layer 118 form an electrical junction. As a probe 112 is scanned along the ferroelectric layer 118 (610), the circuit 120 uses the probe 112 to sense local changes in properties of the junction induced by the dipole polarization (612). For example the circuit 120 can sense changes in junction capacitance or junction leakage current. These changes indicate whether polarity reversals occur at the bits.

Figure 6B:
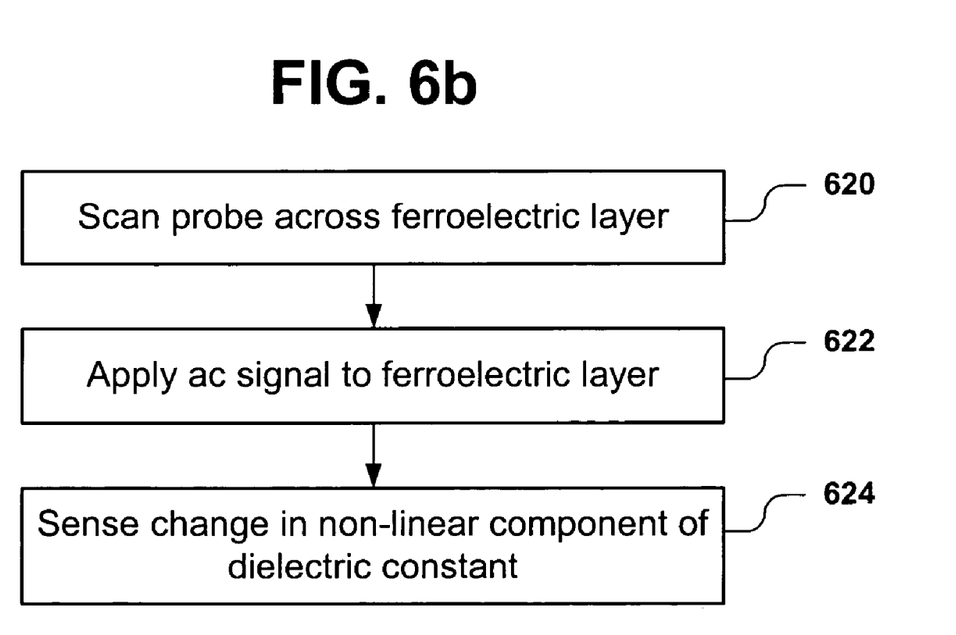

FIG. 6b shows a second example. The substrate 114 is made of a semiconductor. At an interface, the semiconductor substrate 114 and the ferroelectric layer 118 form an electrical junction. As a probe 112 is scanned along the ferroelectric layer 118 (620), the circuit 120 uses the probe 112 to apply an ac signal to local areas on the ferroelectric layer 118 (622), and detect changes in the non-linear component of its dielectric constant by sensing a shift in capacitance phase of the junction (624). The capacitance shifts indicate the polarity reversals. The ac signal is low enough not to cause the polarities of the scanned bits to flip.

Figure 6C:
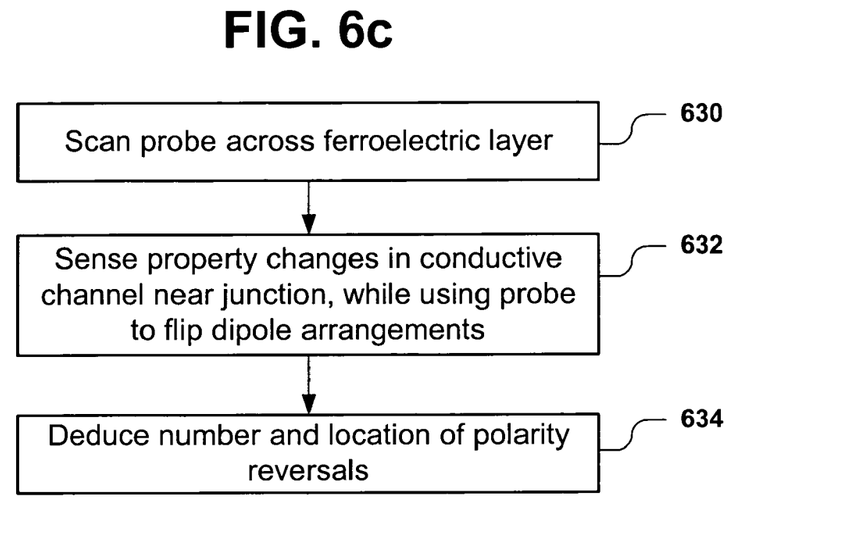

FIG. 6c shows a third example. The substrate 114 is made of a semiconductor. A probe 112 is scanned along the ferroelectric layer 118 (630), and the circuit 120 senses changes in properties of an electric conduction channel of the substrate 114 (632). The channel is formed in the vicinity of a junction formed by the ferroelectric layer 118 and the semiconductor substrate 114. This channel may span more than one bit and its width is affected by a local dipole orientation in the ferroelectric layer 118. Measurement of the channel electrical properties (e.g., resistance) by another circuit within the substrate 114 combined with an appropriate sparring algorithm can be used to deduce the number and location of flipped bits 413 (634). For example, an ac signal is applied to the channel, and resistance of the channel length is measured. The dipoles of a bit are oriented in one direction (e.g., by an erase operation), and the channel resistance is measured again. No change in resistance indicates one logic state, and a change in resistance indicates a second logic state. If the resistance is changed, a write operation is performed to restore the logic state.

Figure 7A:
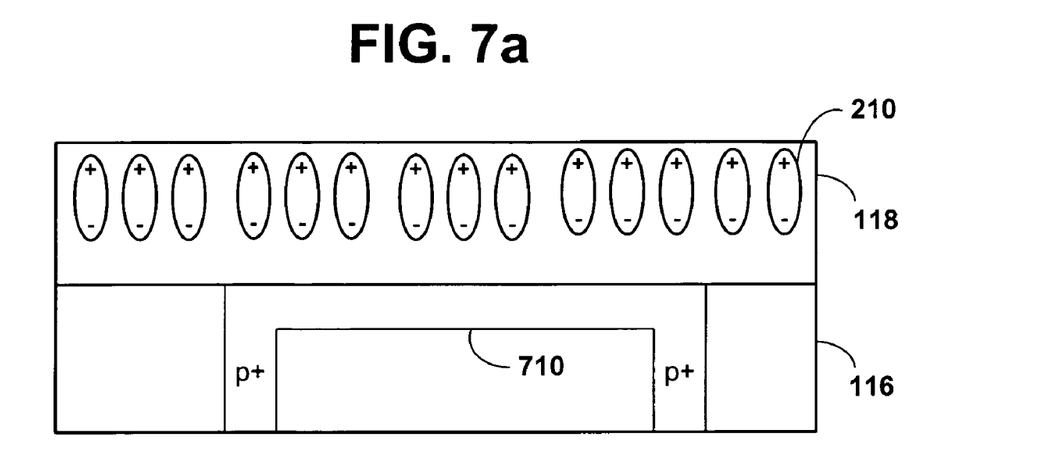
FIGS. 7a-7c are illustrations of a conductive channel during a read operation in accordance with an embodiment of the present invention.
Figure 7B:
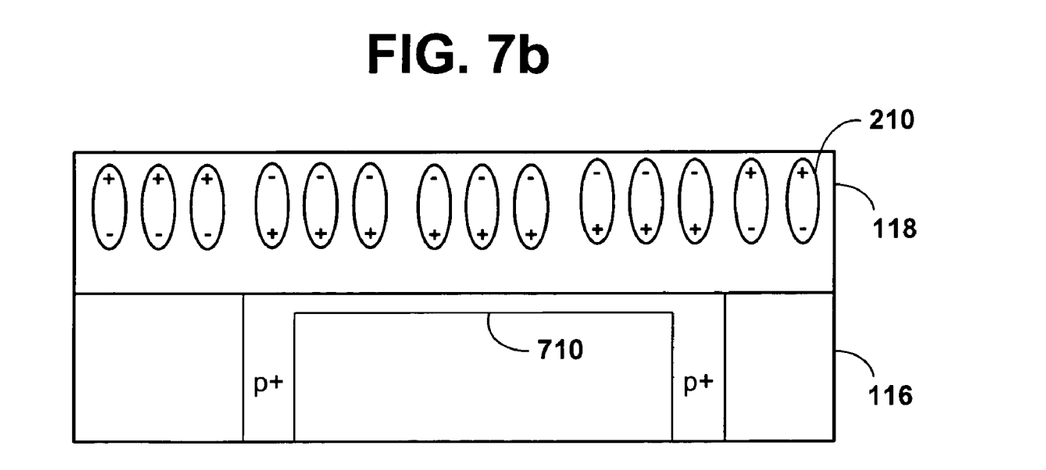
Figure 7C:
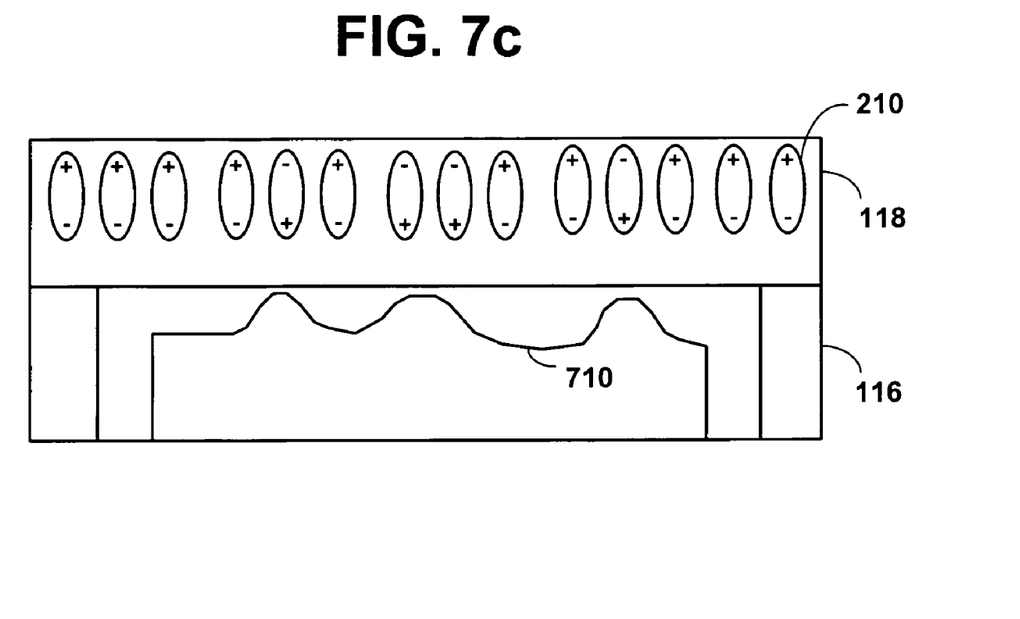

FIGS. 7a-7c illustrate the conductive channel 710 during the read operation of FIG. 6c. FIG. 7a shows the conductive channel 710 before dipoles are flipped. FIGS. 7b and 7c shows the effect of variations in the channel width as a result of flipping the dipoles: The channel width follows the distribution of flipped dipoles.

Figure 6D:
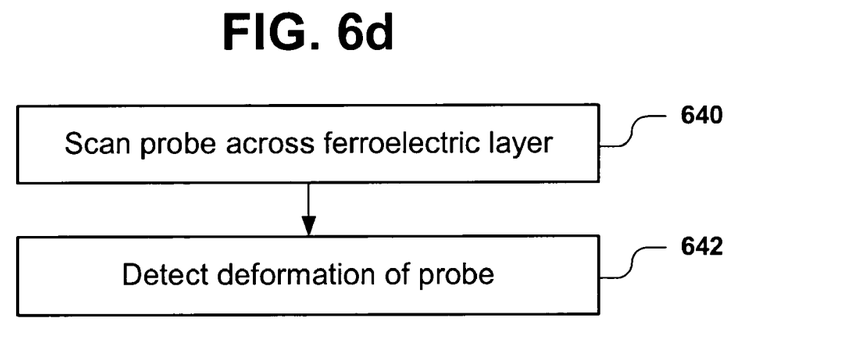

FIG. 6d shows a fourth example. A probe 112 is scanned along the ferroelectric layer 118 (640), and the circuit 120 detects deformation of the probe 112 (642). The deformation indicates polarization reversals in the ferroelectric layer 118. Such a probe 112 may include a section made of a piezoelectric material. Electromagnetic interaction (attractive and repulsive forces) between the ferroelectric layer 118 and the probe tip deform the probe 112. The piezoelectric crystal generates a signal that is proportional to the deformation. Alternatively, probe deformation could be detected by reflecting light off the probe 112; and detecting a change in the reflection angle of the light beam as the probe 112 is deformed while interacting with the ferroelectric layer 118. Each change in reflection angle indicates a polarity reversal.

Figure 6E:
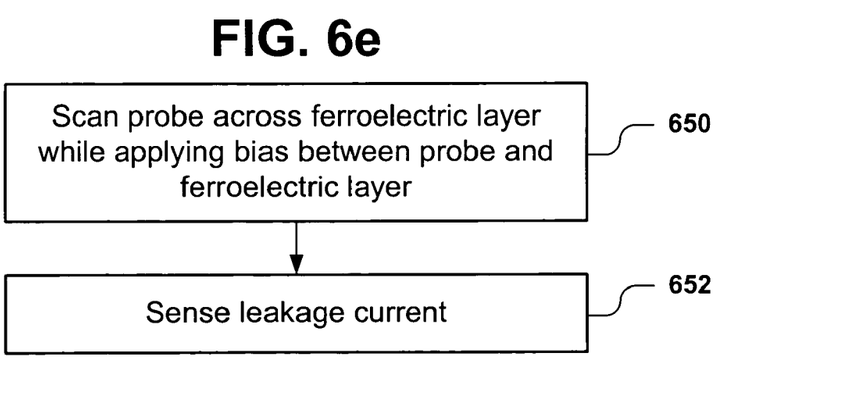

FIG. 6e shows a fifth example. A probe 112 is scanned along the ferroelectric layer 118 (650) while a bias is applied between the probe 112 and the substrate 114. The circuit 120 senses a leakage current flowing through the ferroelectric layer 118 (652). Magnitude of the leakage current is modulated by the polarity of the bit being scanned 413, and thus can indicate polarity reversals.

Figure 6F:
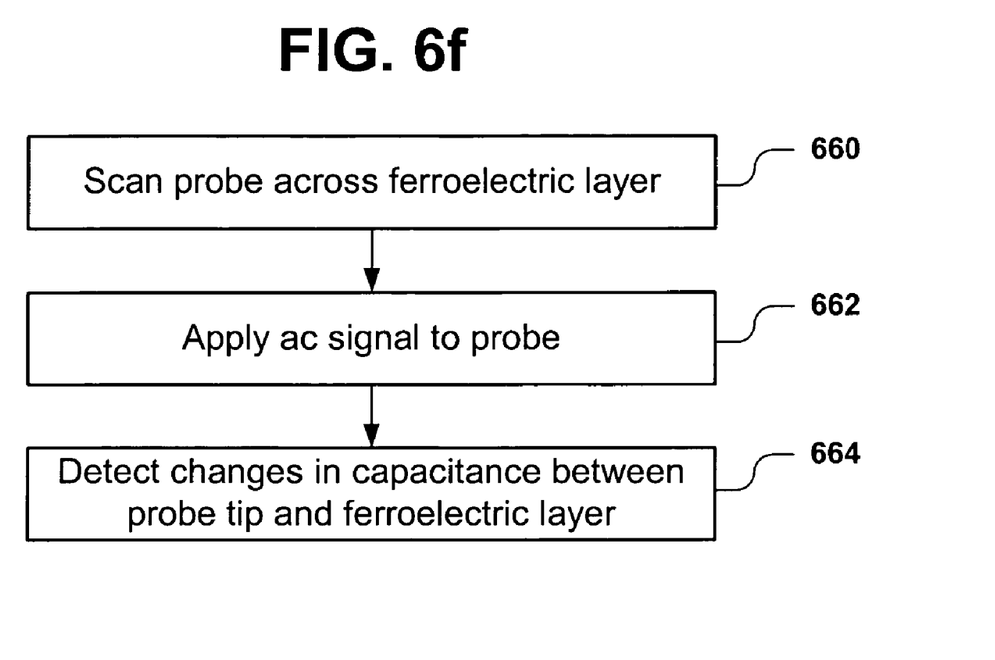

FIG. 6f shows a sixth example. A probe 112 is scanned along the ferroelectric layer 118 (660), and the circuit 120 causes the probe 112 to apply an ac signal to the ferroelectric layer (662) and detect changes in capacitance between the tip and ferroelectric layer (664). The changes in capacitance indicate polarity reversals on the ferroelectric layer 118. The ac signal is sufficiently low so as not to cause the polarities of the scanned bits to flip.

Figure 6G:
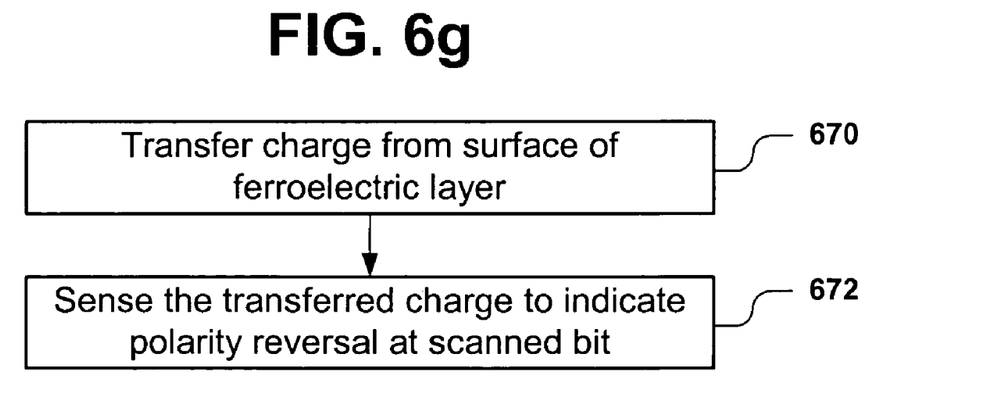

FIG. 6g shows a seventh example. Bit polarization causes a local charge to be stored on the surface of ferroelectric layer 118. This charge can be transferred into the circuit 120 via the probe 112, when the probe 112 is in contact with ferroelectric layer 118 (670). The circuit 120 senses the transferred charge, which indicates whether polarity was reversed when a bit is scanned (672).

The bits 413 may be refreshed if there is a concern about bit retention over an extended period of time. Periodically, bits 413 can be read, temporarily stored at either external memory or at other locations of the ferroelectric layer 118, and then rewritten into the areas of their original storage. This process may be performed occasionally during the bit lifetime.

Figure 8:
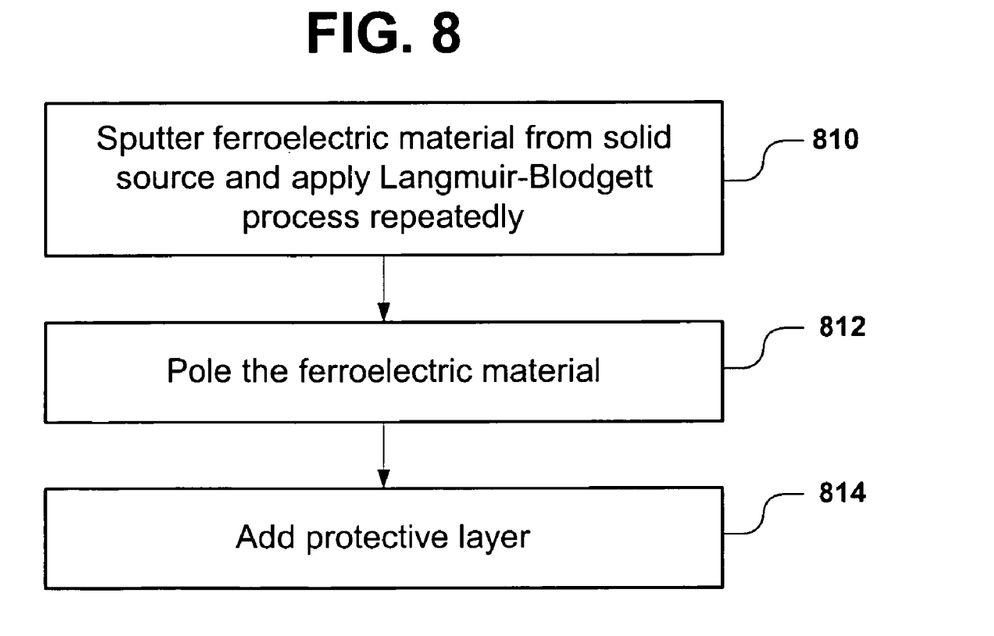
FIG. 8 is an illustration of an exemplary method of manufacturing a data storage device in accordance with an embodiment of the present invention.

Reference is made to FIG. 8, which illustrates an exemplary method of forming the data storage medium 116. A layer 118 is formed on a substrate 114 by spinning a dissolved ferroelectric polymer on the substrate 114 and heating to remove solvent in the polymer. Ferroelectric material can also be sputtered from a solid source, or it can be formed by the Langmuir-Blodgett process (which would be applied repeatedly until the film has a desired thickness, or both sputtering and the Langmuir-Blodgett process may be used to form the ferroelectric layer 118 (810). The desired thickness of the layer 118 may be less than one micron.

The layer 118 may be polarized (812). This process can be accomplished by exposing the layer 118 to plasma (typically a weak corona discharge) with poling field in the range of few tens to a few hundreds megavolts per meter. Usually, during this process the substrate 114 is held at temperature around 100° C. and at ground potential to eliminate any possibility of damaging the electronic devices that might be part of the substrate 114.

Simultaneous heating can enhance poling. Heat could be supplied by a heat lamp or a microwave source, or it could be supplied by a heated plate below the substrate 114.

A protective layer 122 may be added (814). For example, a protective polymeric layer may be added by using method similar to that used for adding the polymeric ferroelectric layer 122.

The coercivity (the electric field needed to align the dipoles) and the Curie temperatures (maximum temperature at which dipole alignment is maintained) depend upon the type of the polymer, polymer preparation, phases present in the polymer and degree of crystallinity. The coercivity and Curie temperature can be tailored according to the technological requirements by selecting the proper ferroelectric material, using the proper ferroelectric blends and mixtures, and controlling polymer crystallization and polymer phases.

Instead of polarizing the ferroelectric layer 118 during manufacture, the ferroelectric layer 118 may be formatted after manufacture by applying the same bias at each point where a bit 413 can be written. This can be performed by pre-formatting the ferroelectric layer 118 (e.g., dragging the probe tips along the surface of the ferroelectric layer 118 while applying a constant poling voltage to the probes 112). The post-manufacture poling can also be accomplished by placing the ferroelectric layer 118 in a vicinity or within appropriately biased plasma or inbetween a pair of poling electrodes.

Thus disclosed is a data storage device 110 having an extremely high storage density. The device uses a data storage medium that has a relatively low cost, and that can use a wide range of available polymers. Probe tips can be dragged along the ferroelectric layer 118, even if they mechanically damage the top part of the ferroelectric layer 118 or the sacrificial layer 122. Tip wearout is greatly minimized, since the ferroelectric material is much softer than the probe tip.

The data storage device 110 consumes low power during data access operations. Write operations can be performed quickly, without passing current through the recording medium. Write voltages can be in a range (e.g., 20V to 100V) that are within the capability of standard IC manufacturing processes. The device can perform block erasures, or bulk erasures, or both.

Although specific embodiments of the present invention have been described and illustrated, the present invention is not limited to the specific forms or arrangements of parts so described and illustrated. Instead, the present invention is construed according to the following claims.

What is claimed is:

1. A data storage device comprising a conductive probe having a tip; a substrate including a semiconductor portion; a data storage medium including a layer of poled ferroelectric material for storing data, the poled ferroelectric layer on the substrate, between the tip and the substrate, the semiconductor portion and the poled ferroelectric layer forming an electrical junction; and a circuit configured to provide a constant voltage bias to the conductive probe as the conductive probe is dragged across multiple bits stored in the poled ferroelectric layer to perform block and bulk erasure operations.

2. A method of reading information from a ferroelectric layer that is on a semiconductor substrate and forms an electrical junction with the semiconductor substrate, the method comprising:

scanning a surface of the ferroelectric layer with a probe having a sharp tip, the tip having a diameter of several nanometers; and using the probe and the semiconductor substrate to detect polarity reversals at designated locations on the ferroelectric layer, each polarity reversal at a designated location indicating a first stored value at that designated location, each non-reversal of polarity at an expected location indicating a second logic value stored at that designated location;

wherein the probe is used to sense changes in leakage current of the electrical junction between the semiconductor substrate and the ferroelectric layer.

* * * * *